(12) United States Patent
Tateishi et al.

(10) Patent No.: US 7,492,692 B2
(45) Date of Patent: Feb. 17, 2009

(54) HOLOGRAM RECORDING AND REPRODUCING APPARATUS

(75) Inventors: Kiyoshi Tateishi, Saitama (JP); Michikazu Hashimoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 818 days.

(21) Appl. No.: 11/013,797

(22) Filed: Dec. 17, 2004

(65) Prior Publication Data
US 2005/0135217 A1  Jun. 23, 2005

(30) Foreign Application Priority Data
Dec. 19, 2003  (JP)  ............................. 2003-422219

(51) Int. Cl.
*G11B 7/00* (2006.01)
(52) U.S. Cl. .................................. 369/103; 369/53.28
(58) Field of Classification Search ............... 369/53.28; 359/10, 15, 35, 239
See application file for complete search history.

(56) References Cited

U.S. PATENT DOCUMENTS

| | | | | |
|---|---|---|---|---|
| 5,475,209 A | * | 12/1995 | Nabeshima | ............... 250/201.4 |
| 5,504,596 A | * | 4/1996 | Goto et al. | ..................... 359/24 |
| 6,233,083 B1 | | 5/2001 | Minagawa | |
| 6,538,740 B1 | * | 3/2003 | Shiraishi et al. | ............. 356/401 |
| 6,728,008 B1 | * | 4/2004 | Kamisuwa | .................. 358/474 |
| 6,729,541 B1 | * | 5/2004 | Kurokawa et al. | .......... 235/454 |
| 7,002,891 B2 | | 2/2006 | Horimai | |
| 2004/0042374 A1 | | 3/2004 | Horimai | |

FOREIGN PATENT DOCUMENTS

| | | |
|---|---|---|
| JP | 2000-122012 A | 4/2000 |
| JP | 2002-63733 A | 2/2002 |
| JP | 2002-123949 A | 4/2002 |

* cited by examiner

*Primary Examiner*—Wayne R Young
*Assistant Examiner*—Adam R Giesy
(74) *Attorney, Agent, or Firm*—Nixon & Vanderhye, PC

(57) ABSTRACT

An example hologram recording and reproducing apparatus includes a recording unit which records information on a holographic recording medium by recording interference fringes formed by irradiation of a reference light and an object light corresponding to recording information, a reproducing unit which generates detected information data and a focus error signal on the basis of detected light from the holographic recording medium, and a focus servo unit that carries out focus servo on the basis of the focus error signal. The focus servo unit has a servo target value setting unit which sets a target value for focus servo on the basis of the detected information data. The detected information data also includes information indicative of the position relationship between the recording medium and the reference light or the like. Accordingly, by utilizing the detected information data to set the target value for focus servo, it is possible to carry out more precise focus servo, with managing a variation in the focus servo target value caused by a change in environment such as temperature or a variation in the thickness of the recording medium.

12 Claims, 12 Drawing Sheets

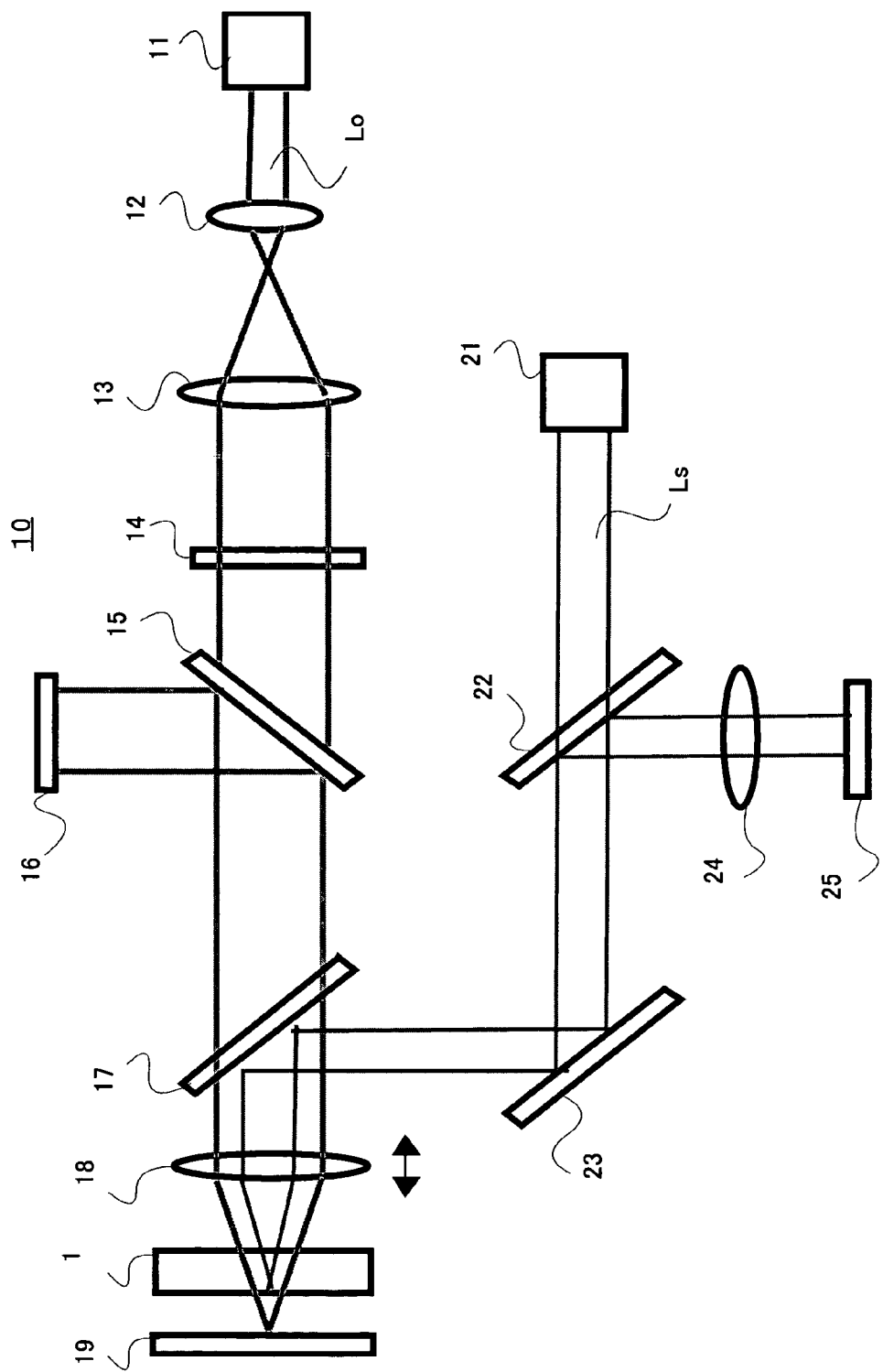

<RELATIONSHIP BETWEEN OBJECTIVE LENS POSITION AND ERROR RATE>

<RELATIONSHIP BETWEEN OBJECTIVE LENS POSITION AND DATA AREA SIZE>

HOLOGRAM RECORDING AND REPRODUCING APPARATUS

BACKGROUND OF THE INVENTION

1. Field of the Invention

The present invention relates to a hologram recording and reproducing apparatus that records and reproduces information on and from a holographic recording medium.

2. Description of the Related Art

There is known a hologram recording technique which records information to be recorded on a holographic recording medium (hereinafter simply referred to as a "recording medium") as interference fringes. One method for this technique uses the information to be recorded to spatially modulate a light from a light source to generate an object light. The apparatus irradiates the recording medium with an object light and a reference light. The object light and the reference light generate interference fringes on the recording medium, and the interference fringes are recorded in a recording layer of the recording medium. On the other hand, for reproduction, the interference fringes recorded on the recording medium are irradiated only with the reference light. A two-dimensional sensor detects a detected light from the recording medium to reproduce the recording information.

Similarly to the recording of information on an optical disc or the like, hologram recording focuses the object light and the reference light on the recording medium. Accordingly, to correctly record and reproduce information, it is necessary to perform what is called focus servo control for controlling the position of an objective lens with respect to the recording medium. Japanese Patent Application Laid-Open under No. 2002-123949 describes an example of focus servo control performed in a hologram recording and reproducing apparatus to generate a focus error signal and thereby control driving of the objective lens. For precise focus servo, it is important to appropriately set a target value for focus servo. However, Japanese Patent Application Laid-Open under No. 2002-123949 does not disclose any method for determining a target value for focus servo.

Other documents, for example, Japanese Patent Applications Laid-Open under Nos. 2002-63733 and 2000-122012 also describe hologram recording.

SUMMARY OF THE INVENTION

The above is an example of the problems to be solved by the present invention. It is an object of the present invention to provide a hologram recording and reproducing apparatus that can perform precise focus servo control by determining an appropriate focus servo target value.

According to one aspect of the present invention, there is provided a hologram recording and reproducing apparatus including: a recording unit which records information on a holographic recording medium by recording interference fringes formed by irradiating an object light corresponding to recording information and a reference light; a reproducing unit which generates detected information data and a focus error signal based on a detected light from the holographic recording medium; and a focus servo unit which performs focus servo based on the focus error signal, wherein the focus servo unit includes a servo target value setting unit which sets a target value for the focus servo based on the detected information data.

The above hologram recording and reproducing apparatus irradiates the holographic recording medium with the reference light and the object light corresponding to the recording information to generate interference fringes, and records the interference fringes in a recording layer. Further, to reproduce information, the apparatus irradiates the recording medium only with the reference light to reproduce the recording information on the basis of the reproduction light obtained. To accomplish high-density control by forming interference fringes in a thickness direction of the recording medium, it is necessary to precisely perform focus control on the recording medium. The focus control adjusts the relative position between the recording medium and an objective lens or the like which irradiates the recording medium with the reference light and the object light.

For reproduction, detected information data corresponding to the recording information as well as a focus error signal are generated on the basis of detected light obtained from the recording medium by, for example, irradiating the reference light. The focus servo unit performs the focus servo on the basis of the focus error signal. Here, the target value for focus servo is determined on the basis of the detected information data, corresponding to the recording information. The detected information data also includes information indicative of the position relationship between the recording medium and the reference light or the like. Accordingly, by utilizing the detected information data to set the target value for focus servo, it is possible to carry out more precise focus servo, with managing a variation in the focus servo target value caused by a change in environment such as temperature or a variation in the thickness of the recording medium.

In the present embodiment, the method of generating the reference light and the object light is not particularly limited. Further, the focus servo signal may be generated from the detected light corresponding to the reference light for signal reproduction or from detected light obtained by irradiating a light beam exclusively used for the focus servo.

According to one mode of the hologram recording and reproducing apparatus, the servo target value setting unit may set the target value for focus servo based on a position relationship between a plurality of markers included in the detected information data. When information is recorded on the recording medium, a plurality of markers are recorded at predetermined positions, for example, in each area corresponding to one page of recording information in order to identify one unit of recording information. When the recording information is reproduced, the markers are detected to detect one unit of recording information, and the detected information data is generated. While the focus servo is being correctly performed, the plurality of markers in the detected data obtained from the detected light exist at the predetermined positions. However, while the focus servo is being incorrectly performed, the plurality of markers are shifted from their predetermined positions. Accordingly, the target value for focus servo can always be correctly set based on the position relationship between the plurality of markers in the detected data obtained from the detected light.

In a preferred example, the servo target value setting unit may include: a unit which detects a distance between two markers included in the detected information data; and a unit which sets the target value for the focus servo based on a result of a comparison of the distance between the markers with a predetermined distance reference value. The distance between two markers can be used as the position relationship between the plurality of markers used to set the focus servo target value. In this case, the recording unit may have a spatial modulator which spatially modulates a light from a light source based on the recording information to generate the object light, and the distance reference value is the difference between the two markers on the spatial modulator. If the focus servo is correctly performed, the distance between the two markers included in the detected data obtained from the detected light should be equal to the distance between the two markers displayed on the spatial modulator. Thus, the focus servo target value may be set on the basis of the result of a comparison of these distances.

In another preferred example, the servo target value setting unit may include: a unit which detects a size of a marker area defined by the plurality of markers included in the detected information data; and a unit which sets the target value for the focus servo based on a result of a comparison of the size of the marker area with a predetermined area reference value. The size of the marker area defined by the plurality of markers can be used as the position relationship between the plurality of markers used to set the focus servo target value. In this case, the recording unit may have a spatial modulator which spatially modulates a light from a light source based on the recording information to generate the object light, and the area reference value is the size of the marker area on the spatial modulator. If the focus servo is correctly performed, the size of the marker area included in the detected data obtained from the detected light should be equal to the size of the marker area displayed on the spatial modulator. Thus, the focus servo target value may be set on the basis of the result of a comparison of the sizes of the areas.

According to another mode of the hologram recording and reproducing apparatus, the servo target value setting unit may set the target value for the focus servo based on an error rate of the detected information data. If the focus servo is correctly performed, the error rate for the detected information data is low. Accordingly, precise focus servo can be performed by setting the focus servo target value on the basis of the error rate of the detected information data.

According to still another mode of the hologram recording and reproducing apparatus, the servo target value setting unit may include: a first determining unit which determines a first target value for the focus servo based on a position relationship between the plurality of markers included in the detected information data; and a second determining unit which determines a second target value for the focus servo based on an error rate of the detected information data, and the focus servo unit may perform the focus servo using the first and the second target values for the focus servo.

In this mode, the servo target value setting unit is configured to determine the focus servo target value on the basis of both the position relationship between the plurality of markers in the detected information data and the error rate of the detected information data. The focus servo is performed using the relationship and the error rate.

In a preferred example of this case, the focus servo unit may perform the focus servo by using the first target value for focus servo during a predetermined period after the focus servo has been started for one holographic recording medium and by using the second target value for focus servo after the predetermined time has elapsed. Thus, during, for example, an initial setting period after the insertion of the recording medium, the focus servo target value is set on the basis of the marker positions. Then, after the subsequent start of reproduction, the focus servo target value is set by detecting the error rate. This makes it possible to set an appropriate focus servo target value depending on the situation. An alternative configuration is possible in which the focus servo is performed by using the first target value for servo control during initialization performed after the insertion of the recording medium and by using the second target value for servo control during the actual reproduction of the recording information.

According to another aspect of the present invention, there is provided a hologram reproducing apparatus which reproduces information from a holographic recording medium on which interference fringes formed by irradiating an object light corresponding to recording information and a reference light are recorded, the apparatus including: a reproducing unit which generates detected information data and a focus error signal based on a detected light from the holographic recording medium; and a focus servo unit which performs focus servo based on the focus error signal, wherein the focus servo unit includes a servo target value setting unit which sets a target value for focus servo based on the detected information data.

In this hologram reproducing apparatus, the detected information data also includes information indicative of the relationship between the recording medium and the reference light or the like. Accordingly, by utilizing the detected information data to set the target value for focus servo, it is possible to carry out more precise focus servo, with managing a variation in the focus servo target value caused by a change in environment such as temperature or a variation in the thickness of the recording medium. Further, this hologram reproducing apparatus can be configured in various manners similar to those in which the above hologram recording and reproducing apparatus is configured.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 1 is a diagram showing the configuration of an optical system in a hologram recording and reproducing apparatus according to an embodiment of the present invention;

DETAILED DESCRIPTION OF THE PREFERRED EMBODIMENTS

Figure 2A:
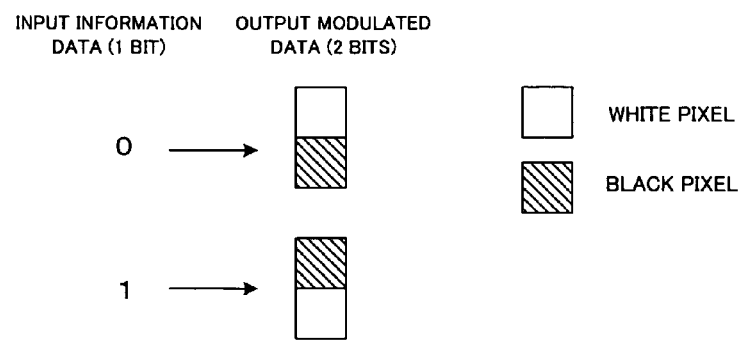
FIGS. 2(a) and 2(b) are diagram showing an example of a two-dimensional digital modulation signal for recording information.

Preferred embodiments of the present invention will be described below with reference to the drawings.

First Embodiment

FIG. 1 shows the configuration of an optical system placed in a pickup of a hologram recording and reproducing apparatus according to a first embodiment of the present invention. In FIG. 1, a pickup 10 includes a recording and reproducing laser 11 that generates a laser light for recording and reproducing information and a servo laser 21 that generates a red laser light for focus servo control.

When information is recorded, a light beam Lo is first emitted by the recording and reproducing laser 11. A beam expander constituted by lenses 12 and 13 increases the diameter of the light beam Lo and inputs the light beam Lo to a spatial modulator 14. The spatial modulator 14 can be constituted by, for example, a liquid crystal element. The spatial modulator 14 has a plurality of pixels arranged like a lattice.

The spatial modulator 14 displays a pattern of white and black pixels obtained by executing a two-dimensional digital modulation of information to be recorded. The spatial modulator 14 uses the pattern to spatially modulate the light beam Lo. FIG. 2 shows an example of the two-dimensional modulation executed by the spatial modulator 14. In this example, as shown in FIG. 2(a), digital input information data, that is, information data "0" and "1" to be recorded on a recording medium 1, is expressed using a combination of white and black pixels. An array of white and black pixels arranged in this order in a vertical direction corresponds to the input information data "0". An array of black and white pixels arranged in this order in the vertical direction corresponds to the input information data "1". In this example, 1-bit input information data is converted into 2-bit (2-pixel) two-dimensional modulated data. This example is thus called a 1:2 differential modulation.

Figure 2B:
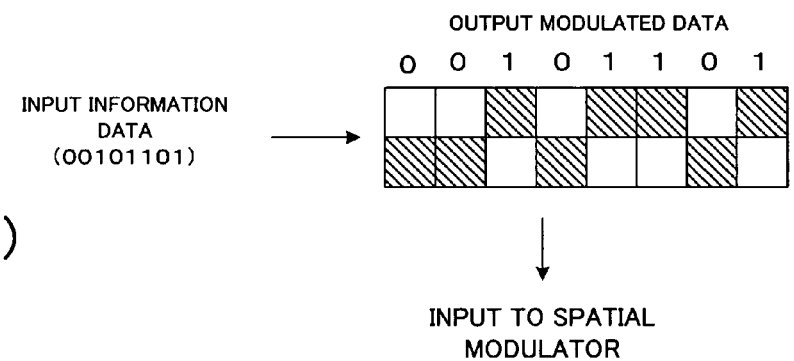

FIG. 2(b) shows, as output modulated data, two-dimensional modulated data obtained by subjecting input information data "00101101" to a two-dimensional digital conversion. Namely, the modulated image pattern constituted by white and black pixels is displayed on the spatial modulator 14 as output modulated data. The light beam Lo incident on the spatial modulator 14 is transmitted through the white pixel portions of the space modulated image pattern. The light beam Lo is blocked in the black pixel portions. Consequently, the spatial modulator 14 emits the light beam Lo optically modulated by the spatially-modulated image pattern. This is an example of a spatial modulation, and the application of the present invention is not limited to the above modulation system. It is possible to use any two-dimensional modulation system such as what is called a 2:4 modulation system that converts 2-bit input information data into 4-bit two-dimension modulated data, provided that input information data can be converted into two-dimensional modulated image pattern and that the spatial modulator can be driven to spatially modulate a light beam.

The light beam Lo spatially modulated by the spatial modulator 14 passes through a half mirror 15 and a dichroic mirror 17. An objective lens 18 focuses the light beam Lo, and the holographic recording medium 1 is irradiated with the focused light beam. The dichroic mirror 17 has wavelength selectivity. The dichroic mirror 17 allows the light beam Lo from the recording and reproducing laser 11 to pass through, but reflects the light beam Ls from the servo laser 21.

A mirror 19 is provided behind the recording medium 1 (opposite the objective lens 18). The light beam Lo focused by the objective lens 18 passes through the recording medium 1, and is reflected by the mirror 19 and then enters the recording medium 1 again. Accordingly, interference fringes are formed in the recording medium 1 by the light beam entering the recording medium 1 directly from the objective lens 18 and the light beam entering the medium 1 after being reflected by the mirror 19.

The light beam Lo entering the medium 1 after being reflected by the mirror 19 passes through the dichroic mirror 17. The light beam Lo is reflected by a half mirror 15 and then received by a two-dimensional sensor 16. The two-dimensional sensor 16 may be, for example, a CCD array or a CMOS sensor. The two-dimensional sensor 16 outputs an electric signal corresponding to the quantity of the incident light.

On the other hand, at the time of reproducing information, the spatial modulator 14 is controlled to a non-modulation state (that is, a total light transmission state). Accordingly, the light beam Lo emitted by the recording and reproducing laser 11 is applied to the recording medium 1 through the half mirror 15, the dichroic mirror 17, and the objective lens 18 without being modulated by the spatial modulator 14. This light becomes a reproduction reference light. In the recording medium 1, a detected light is generated by the reproduction reference light and the interference fringes recorded on the recording medium 1. The detected light passes through the objective lens 18 and dichroic mirror 17. The detected light is then reflected by the half mirror 15 and enters the two-dimensional sensor 16. Thus, a spatially-modulated image pattern of white and black pixels created at the time of recording is formed on the two-dimensional sensor 16, and this pattern is detected to obtain reproduced information corresponding to the recording information.

On the other hand, the light beam Ls emitted by the servo laser 21 (hereinafter referred to as the "servo beam") passes through a half mirror 22 and is then reflected by a mirror 23. The light beam Ls is further reflected by the dichroic mirror 17 and is irradiated on the objective lens 18. The objective lens 18 focuses the servo beam Ls as well as the light beam Lo from the recording and reproducing laser 11 on the recording medium 1. The servo beam Ls is reflected by a reflection layer provided in a back surface of the recording medium 1. The servo beam Ls is further reflected by the dichroic mirror 17, the mirror 23, and the half mirror 22. Then, a cylindrical lens 24 gives, to the servo beam Ls, astigmatism corresponding to the amount of shift from a focal position. A quadruple photo detector 25 then receives the servo beam Ls. The quadruple photo detector 25 outputs an electric signal corresponding to the quantity of light received. Accordingly, by using the quadruple photo detector 25 to detect the amount of astigmatism, it is possible to obtain a focus error indicative of the amount of shift from the focal position.

Figure 3:
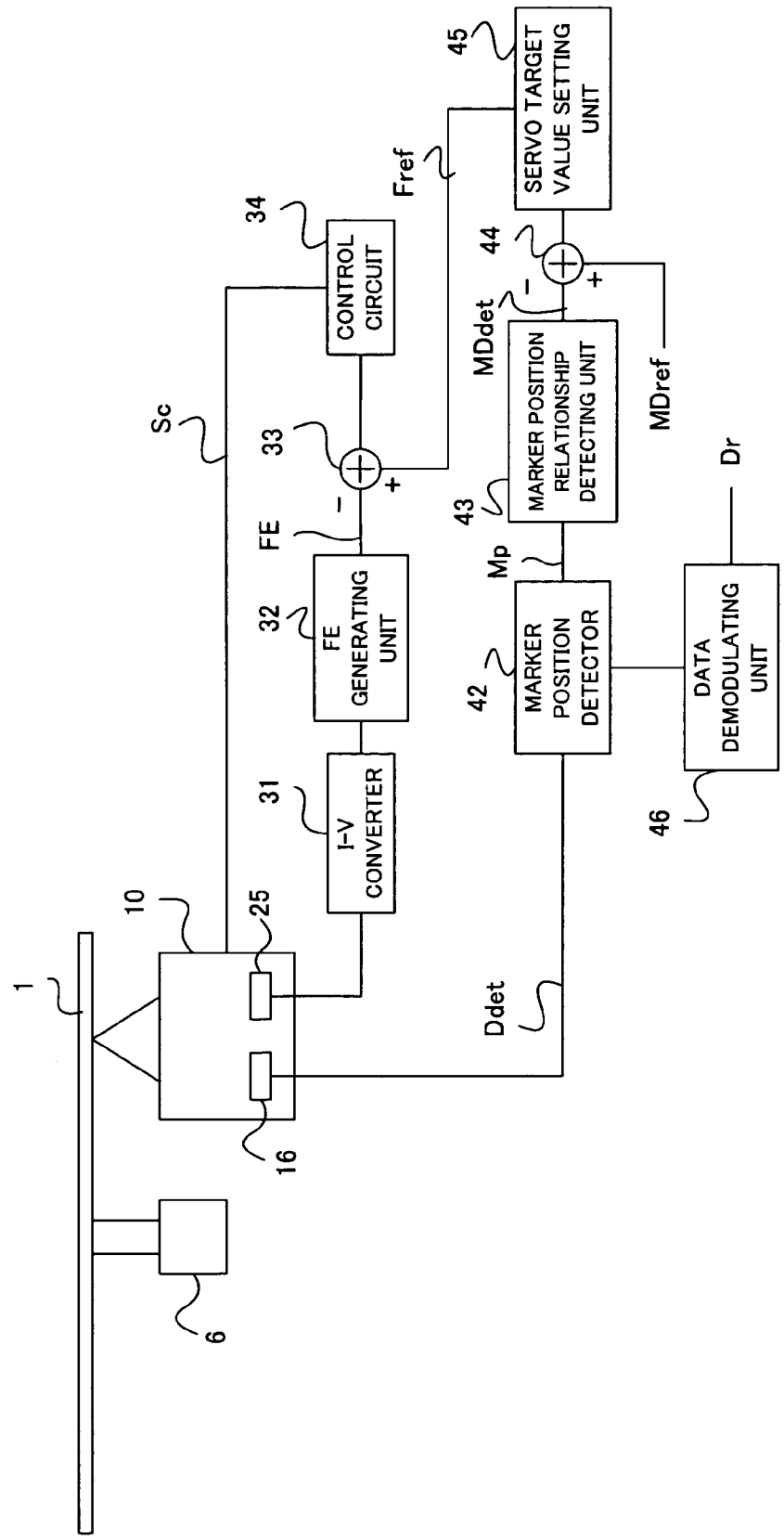
FIG. 3 is a block diagram schematically showing the configuration of a signal processing system in a hologram recording and reproducing apparatus according to a first embodiment.

Now, description will be given of a signal processing system in the hologram recording and reproducing apparatus according to the present embodiment. FIG. 3 is a block diagram schematically showing the configuration of the signal processing system of the hologram recording and reproducing apparatus according to the first embodiment.

The signal processing system of the hologram recording and reproducing apparatus is roughly divided into a reproduction system that reproduces recording information to output reproduced information data and a servo system that performs servo control such as a focus servo, a tracking servo and a spindle servo. FIG. 3 schematically shows the configuration of the reproduction system and a focus servo system included in the servo system. In FIG. 3, the reproduction system is constituted by a marker position detector 42 and a data demodulating unit 46. Further, the focus servo system is constituted by an I-V converter 31, a focus error (FE) generating unit 32, an adder 33, a control circuit 34, a marker position relationship detecting unit 43, an adder 44, and a servo target value setting unit 45.

In the hologram recording and reproducing apparatus according to the present embodiment, a tracking servo and a spindle servo are carried out. However, methods for these operations do not relate directly to the present invention. Accordingly, the illustration and description of such methods are omitted. Known techniques can be applied to the tracking servo and the spindle servo.

In FIG. 3, the recording medium 1 is shaped like a disc. A spindle motor 6 controls the rotation of the recording medium 1. The recording medium 1 controllably rotated by the spindle motor 6 is irradiated with the recording and reproducing light beam Lo from the pickup 10. The pickup 10 includes the optical system illustrated in FIG. 1. As shown in FIG. 1, in the pickup 10, the recording medium 1 is irradiated with the light beam Lo emitted by the recording and reproducing laser 11. The two-dimensional sensor 16 receives the return light beam. Output data from the two-dimensional sensor 16 is mainly processed by the reproduction system. Further, the recording medium 1 is also irradiated with the light beam Ls emitted by the servo laser 21. The quadruple photo detector 25 receives the return light beam. An output signal from the quadruple photo detector 25 is processed by the focus servo system.

First, the operation of the reproduction system will be described. In FIG. 3, the two-dimensional sensor 16 in the pickup 10 outputs a two-dimensional image signal (hereinafter referred to as "detected image data Ddet") corresponding to the quantity of light received. As previously described, the detected image data Ddet has digital values "0" and "1" corresponding to the spatially-modulated image pattern generated on the basis of the recording information and displayed on the spatial modulator 14 during recording.

The marker position detector 42 detects marker positions in the detected image data Ddet. Markers are information required to identify one unit (one page) of information recorded on the recording medium 1. The marker is normally configured as an image portion having a predetermined shape. The markers are added to the recording information before the information is recorded on the recording medium 1. During reproduction, the markers are detected to identify one unit (one page) of recording information to reproduce the recording information included in that page.

Figure 4A:
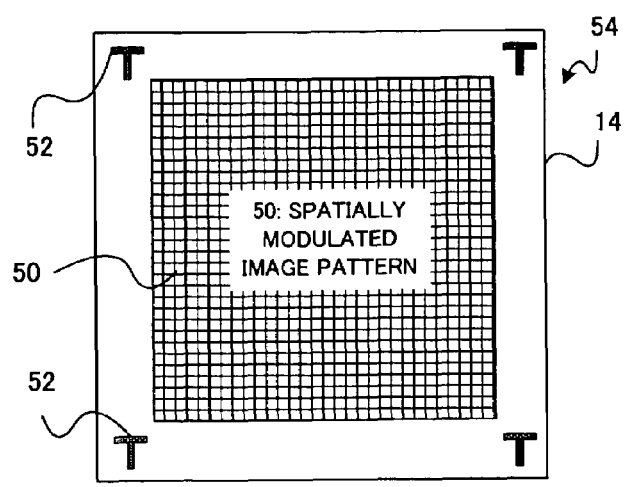
FIGS. 4(a) to 4(c) are diagrams showing an example of markers displayed on a spatial modulator, an inter-marker distance, and a marker area size.

Specifically, the markers are added to the spatially-modulated image pattern displayed on the spatial modulator 14. FIG. 4 shows an example of a spatially-modulated image pattern including the markers. In the example shown in FIG. 4(a), the spatially-modulated image pattern 50 is displayed substantially at the center of a display area of the spatial modulator 14. Further, T-shaped markers 52 are displayed outside the spatially-modulated image pattern 50 and at the four corners of the display area of the spatial modulator 14. The spatial modulator 14 spatially modulates recording information received from a recording signal processing system (not shown) to generate the spatially-modulated image pattern 50. The spatial modulator 14 displays the spatially-modulated image pattern 50 in the display area as shown in FIG. 4(a). Moreover, the spatial modulator 14 displays the predetermined markers 52 at the predetermined positions in the display area. As schematically shown in FIG. 4(a), a displayed image 54 including the spatially-modulated image pattern 50 and the markers 52 is thus displayed in the display area of the spatial modulator 14.

When the recording information is reproduced, the detected image data Ddet output by the two-dimensional sensor 16 has digital values corresponding to the displayed image 54 displayed on the spatial modulator 14 during recording. Accordingly, the marker position detector 42 writes the detected image data Ddet into a memory or the like. The marker position detector 42 then detects the marker positions to extract one page of recording information.

Figure 5A:
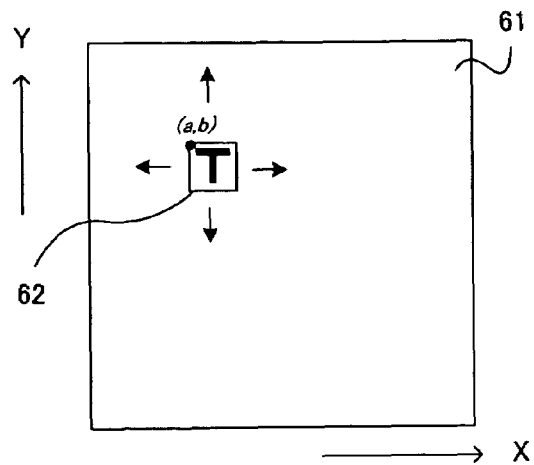
FIGS. 5(a) to 5(c) are diagrams illustrating a method for detecting the marker positions and a method for calculating the inter-marker distance and the marker area size.
Figure 5B:
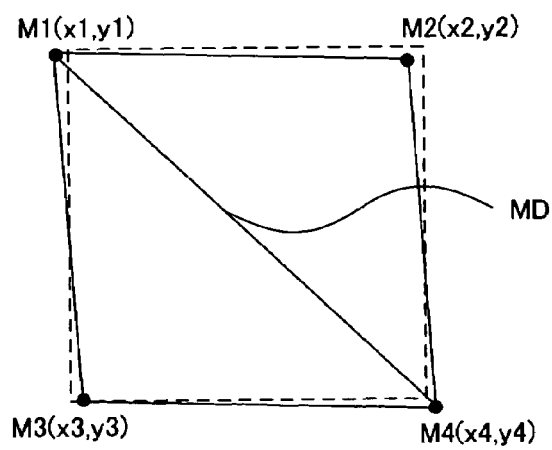
Figure 5C:
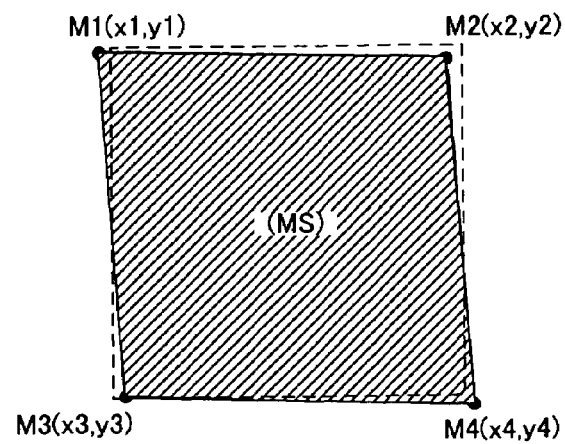

The marker positions are detected by template matching. The template matching is a method of matching image data constituting the detected image data Ddet with image data constituting the markers to detect the marker positions in the detected image data Ddet. FIG. 5(a) shows an example of the template matching. In FIG. 5, a reproduced data image 61 is an image of the detected image data Ddet corresponding to the displayed image 54 displayed on the spatial modulator 14 during recording (however, for convenience, only the area of the reproduced data image is shown with the contents of the image omitted). In contrast, a template image 62 corresponds to the marker 52, used during recording.

Figure 6A:
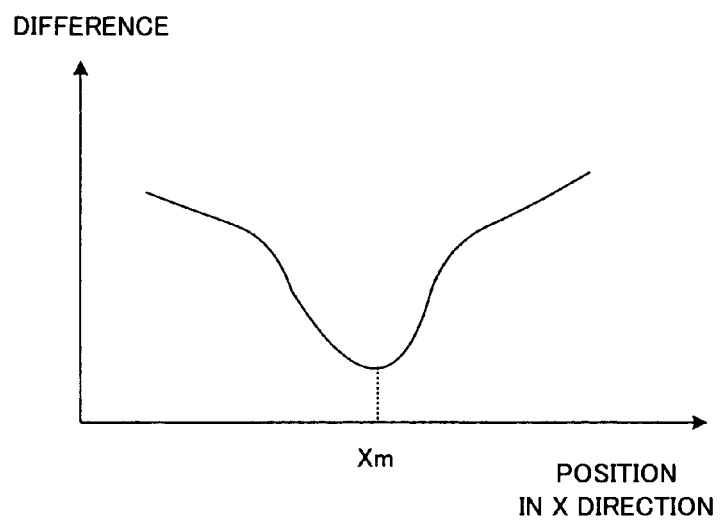
FIGS. 6(a) and 6(b) are graphs showing the difference between the position of template image data and the corresponding detected image data.
Figure 6B:
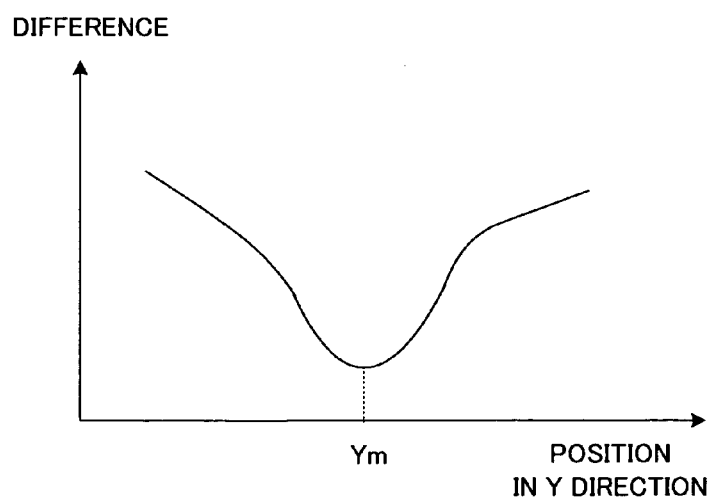

In the template matching, the template image 62 is moved on the reproduced data image 61 in an X and Y directions as shown in FIG. 5(a) to calculate the value of the difference between the reproduced data image and the template image 62. FIG. 6 shows an example of a graph showing difference values calculated in the X and Y directions. FIG. 6(a) shows the value of the difference between the template image 62 and the reproduced data image 61 in the corresponding area, obtained as the template image 62 is moved on the reproduced image data 61 in the X direction. As shown in FIG. 5(a), as the coordinate value in the X direction, a coordinate point (a, b) in the upper left of the template image 62 is used. A point Xm with the minimum difference value indicates the coordinate of the image portion on the reproduced data image 61 corresponding to the marker 52. FIG. 6(b) shows the value of the difference between the template image 62 and the reproduced data image 61 in the corresponding area, obtained as the template image 62 is moved on the reproduced data image 61 in the Y direction. As shown in FIG. 5(a), as the coordinate value in the Y direction, the coordinate point (a, b) in the upper left of the template image 62 is used. A point Ym with the minimum difference value indicates the coordinate of the image portion on the reproduced data image 61 corresponding to the marker 52. Consequently, the position coordinates of the marker 52 on the reproduced data image 61 are detected as (Xm, Ym).

In this manner, the marker position detector 42 detects the position coordinates of all the markers 52 included in the display image 54 displayed on the spatial modulator 14, and then supplies the position coordinates to the data demodulating unit 46 as marker position data Mp.

On the basis of the marker position data Mp, the data demodulating unit 46 identifies the positions of the markers 52 shown in FIG. 4 to identify one page of recording information. Further, on the basis of the position of the marker 52, the data demodulating unit 46 identifies the position of the spatially-modulated image pattern 50, and demodulates the detected information data corresponding to the recording information.

In this case, the data demodulating unit 46 carries out geometrical correction. The geometrical correction is the correction of misalignment in the pixel position which may occur during image recording and reproduction. During recording, an image is transferred from the spatial modulator 14 to the recording medium 1. During reproduction, an image is transferred from the recording medium 1 to the two-dimensional sensor 16 via the optical system. A variation in the magnification of the optical system, distortion, the contraction of the medium, or the like may occur between recording and reproduction. It is thus nearly impossible to match the positions of the pixels on the spatial modulator 14 during recording with the positions of the pixels on the two-dimensional sensor 16 during reproduction. Thus, the geometrical correction is carried out for each page of recording information using the marker positions as a reference. Specifically, on the basis of the difference between the original positions of the markers 52 on the spatial modulator 14 and the positions of the markers 52 detected in the reproduced image pattern 61, the positions of the pixels included in the spatially-modulated image pattern 50 are corrected to acquire detected information data.

The data demodulating unit 46 thus demodulates the detected information data already subjected to the geometrical correction using a demodulation system corresponding to the two-dimensional digital modulation system applied by the spatial modulator 14 during recording, and outputs the reproduced information data Dr corresponding to the recording data. The reproduced information data Dr subsequently undergoes postprocesses including error correction, deinterleaving, and descrambling.

Figure 7:
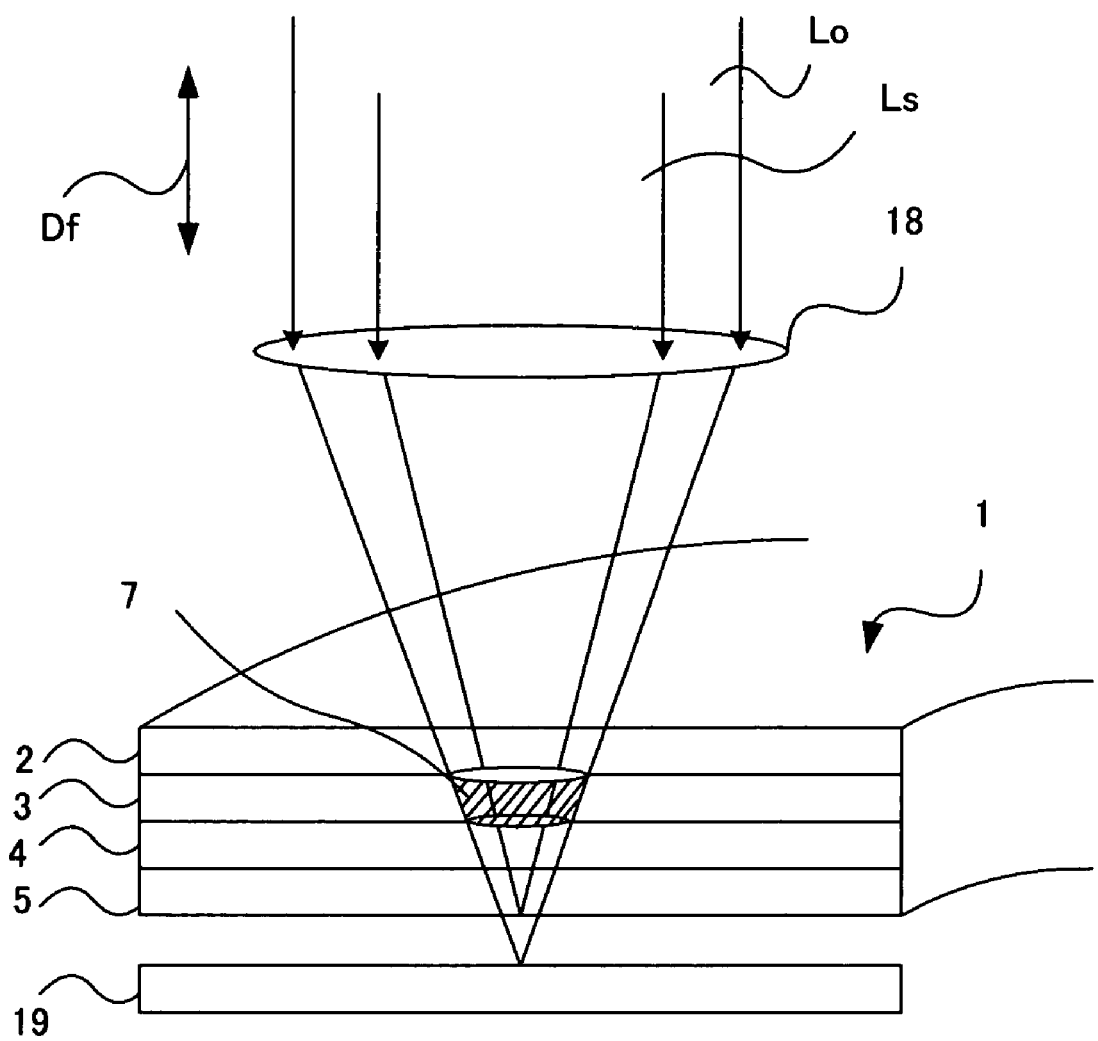
FIG. 7 is a diagram illustrating the concept of focus control.

Now, description will be given of operations of the focus servo system. FIG. 7 shows the concept of the focus servo. The recording medium 1 is constituted by a recording layer 3, transparent protective layers 2 and 4 provided over and under the recording layer 3, and a reflection layer 5 provided under the transparent protective layer 4, all these layers being laminated. The recording layer 3 consists of lithium niobate or a photo polymer, which is a holographic optical recording medium. The reflection layer 5 has wavelength selectivity. The reflection layer 5 thus allows the recording and reproducing light beam Lo emitted by the recording and reproducing laser 11 to pass through, but reflects the light beam Ls emitted by the servo laser 21.

The focus servo is a control to move the objective lens 18 in the vertical direction Df of FIG. 7 so that the recording layer 3 is appropriately irradiated with the recording and reproducing light beam Lo. More specifically, the position of the objective lens 18 is controlled so that the servo light beam Ls is accurately focused on the reflection layer 5 of the recording medium 1.

As shown in FIG. 1, the objective lens 18 focuses the recording and reproducing light beam Lo spatially modulated by the spatial modulator 14, on the recording medium 1. Part of the light beam Lo is reflected by the mirror 19 and then enters the recording medium 1 again. Consequently, interference fringes 7 are recorded on the recording layer 3 by the light beam Lo not reflected by the mirror 19 and the light beam Lo reflected by the mirror 19.

When the objective lens 18 is moved in the vertical direction Df of FIG. 7, the diameter of the light beam Lo focused by the objective lens 18 and entering the recording layer 3 varies. This varies the volume of the interference fringes 7 recorded on the recording layer 3. The hologram recording according to the present embodiment is volume hologram recording in which the interference fringes are three-dimensionally recorded on the recording medium, that is, also in its thickness direction. The focus servo in the volume hologram recording is intended to adjust the vertical recording position of the three-dimensional interference fringes recorded on the recording layer 3 of the recording medium 1 and to maintain the volume of the three-dimensional interference fringe at a fixed value. When the vertical recording position or volume of the three-dimensional interference fringe changes, the crosstalk characteristic between the interference fringes is degraded and it becomes severe to prevent the improvement of the recording density. Therefore, the recording density can be improved by precisely carrying out the focus servo.

As shown in FIG. 1, in the present embodiment, in addition to the recording and reproducing light beam Lo, the servo light beam Ls emitted by the servo laser 21 is irradiated on the recording medium 1. The servo beam Ls is reflected by the reflection layer 5 and further by the dichroic mirror 17, the mirror 23, and the half mirror 22. Then, the servo light beam Ls passes through the cylindrical lens 24 and then enters the quadruple photo detector 25. The servo light beam Ls incident on the quadruple photo detector 25 includes astigmatism corresponding to the amount of shift from the focal position caused by the cylindrical lens 24. Consequently, a focus error signal FE indicative of the amount of astigmatism is obtained by calculating output signals from the quadruple photo detector 25.

Specifically, in FIG. 3, the I-V converter 31 converts output currents from the quadruple photo detector 25 into output voltages. The I-V converter 31 then supplies the output voltages to the FE generating unit 32. On the basis of the values of the voltages, corresponding to the quantity of light received by the light receiving elements of the quadruple photo detector 25 and supplied by the I-V converter 31, the FE generating unit 32 uses what is called an astigmatism method to generate the focus error signal FE. The FE generating unit 32 then inputs the focus error signal FE to the adder 33.

A servo target value setting unit 45 has already input a target value for focus servo (hereinafter referred to as a "servo target value") Fref to the adder 33. The adder 33 subtracts the focus error signal FE from the servo target value Fref, and then supplies the difference to the control circuit 34. In accordance with the difference between the servo target value Fref and the actual focus error signal FE, the control circuit 34 supplies a control signal Sc to the pickup 10. In the pickup 10, the control signal Sc is supplied to, for example, an actuator (not shown) that drives the objective lens 18. The position of the objective lens 18 in the vertical direction Df (see FIG. 7) changes in accordance with the control signal Sc. In this manner, the focus servo is carried out using the servo light beam Ls. That is, in the present embodiment, a focus servo loop is formed by the I-V converter 31, the FE generating unit 32, the adder 33, the control circuit 34, and the pickup 10.

Now, description will be given of a method for determining the servo target value. The present embodiment is characterized in that the servo target value for focus servo is determined utilizing the result of detection of the marker positions. As previously described, the marker position detector 42 detects the marker positions on the basis of the detected image data Ddet from the two-dimensional sensor 16, and supplies the marker position data Mp not only to the data demodulating unit 46 but also to the marker position relationship detecting unit 43. The marker position relationship detecting unit 43 detects the position relationship between the plurality of markers detected.

Figure 4B:
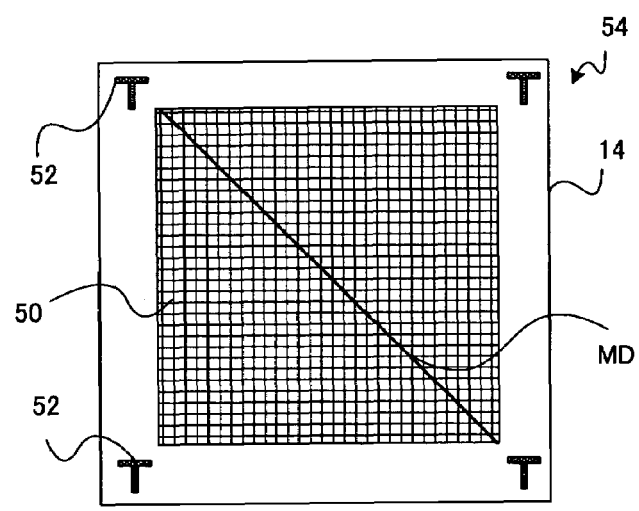

An example of the marker position relationship is the distance between two markers. For example, in a case that the four markers 52 are included in the displayed image 54 displayed by the spatial modulator 14 as shown in FIG. 4(a), the inter-marker distance is the distance MD between the two diagonally located markers as shown in FIG. 4(b).

If the focus servo correctly controls the position of the objective lens 18 with respect to the recording medium 1, the position relationship of the markers 52 in the detected image data Ddet obtained by the two-dimensional sensor 16 coincide with the position relationship of the markers 52 displayed on the spatial modulator 14. However, if the position of the objective lens 18 is not correctly controlled, the position relationship of the markers 52 in the detected image data Ddet differ from the position relationship of the markers 52 displayed on the spatial modulator 14. In other words, if the correct focus servo is being performed, the position relationship between the plurality of markers (that is, the inter-marker distance MD) in the detected image data Ddet matches the position relationship between the markers displayed on the spatial modulator 14. In contrast, the larger the focus error is, the more the difference between the position relationship between the plurality of markers 52 displayed on the spatial modulator 14 and the position relationship between the plurality of markers in the detected image data Ddet is.

Accordingly, in the present embodiment, the servo target value Fref is updated in accordance with the difference between the position relationship between the plurality of markers 52 in the detected image data Ddet and the correct position relationship between the markers 52 displayed on the spatial modulator 14. It is thus possible to more precisely carry out the focus servo using not only the focus error signal FE detected on the basis of the servo beam Ls, but also using the recording and reproducing light beam Lo used to record and reproduce information.

Now, a description will specifically be given of a method for determining the servo target value using the marker position relationship. If the marker position relationship is the inter-marker distance MD, the marker position relationship detecting unit 43 calculates the distance MDdet between the two diagonally located markers 52 from the position coordinates of the four markers 52, detected by the marker position detector 42, as schematically shown in FIG. 5(b). In the example shown in FIG. 5(b), the inter-marker distance MDdet is calculated using the following equation:

$$MDdet=\{(x1-x4)^2+(y1-y4)^2\}^{1/2} \quad (1)$$

If the inter-marker distance MD is used as the marker position relationship, its reference value, that is, the inter-marker distance MDref displayed on the spatial modulator 14 is known. Accordingly, the marker position relationship detecting unit 43 compares the inter-marker distance MDdet with the reference inter-marker distance MDref, and updates the servo target value Fref on the basis of the result of the comparison. For example, the servo target value Fref is updated in accordance with the following equation:

$$Fref=Fref0+(MDref-MDdet) \times \alpha \quad (2)$$

where "Fre0" denotes an initial servo target value or a value obtained by updating the last servo target value and "α" denotes a constant determined depending on, for example, the gain of the optical system.

The above process is executed by the marker position relationship detecting unit 43, the adder 44, and the servo target value setting unit 45. That is, the marker position relationship detecting unit 43 calculates the inter-marker distance MDdet, as the marker position relationship information, using the equation (1). The adder 44 subtracts the inter-marker distance MDdet from the reference inter-marker distance MDref, and supplies the difference to the servo target value setting unit 45. The servo target value setting unit 45 updates the servo target value Fref in accordance with equation (2), and supplies the servo target value Fref thus updated to the adder 33 in the focus servo loop.

Figure 4C:
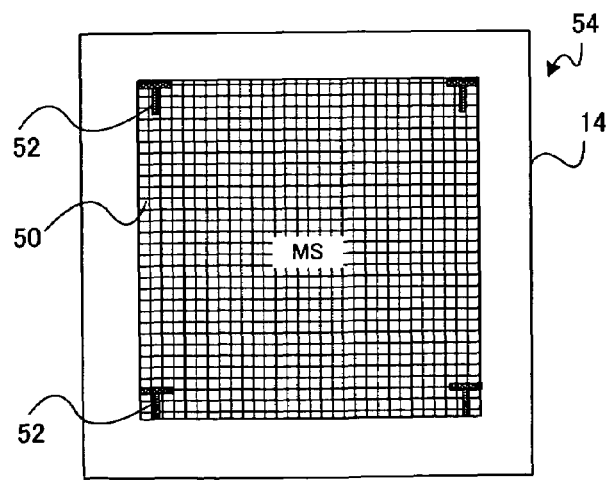

Another example of the marker position relationship is a size MS of an area defined by the four markers 52 (this area will hereinafter be referred to as a "marker area") as shown in FIG. 4(c). If the marker position relationship is the size MS of the marker area, a marker area size MSdet obtained on the basis of the detected image data is calculated using the following equation:

$$MSdet=\{(x2+x4)/2-(x1+x3)/2\} \times \{(y3+y4)/2-(y1+y2)/2\} \quad (3)$$

Even if the marker area size MS is used as the marker position relationship, its reference value, that is, the marker area size MSref displayed on the spatial modulator 14 is known. Accordingly, the marker position relationship detecting unit 43 compares the marker area size MSdet with the reference marker area size MSref, and updates the servo target value Fref on the basis of the result of the comparison. For example, the servo target value Fref is updated in accordance with the following equation:

$$Fref=Fref0+(MSref-MSdet) \times \alpha \quad (4)$$

where "Fref0" denotes an initial servo target value or a value obtained by updating the last servo target value and "α" denotes a constant determined depending on, for example, the gain of the optical system.

Figure 8A:
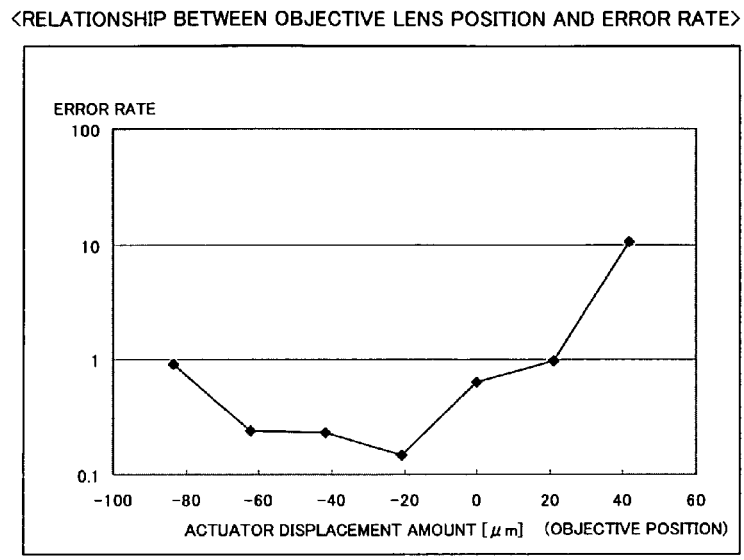
FIG. 8(a) is a graph showing the relationship between the position of an objective lens and an error rate.

FIG. 8(a) shows the relationship between the position of the objective lens and the error rate of reproduced information data. In FIG. 8(a), the axis of abscissa indicates the position of the objective lens 18 as the amount of displacement of the actuator, driving the objective lens 18, using a certain position as a reference. The axis of ordinate indicates the error rate of the reproduced information data Dr. The graph in FIG. 8(a) indicates that the error rate of reproduced information data varies depending on the position of the objective lens, that is, a focusing state, and that there is an objective lens position at which the error rate is minimized.

Figure 8B:
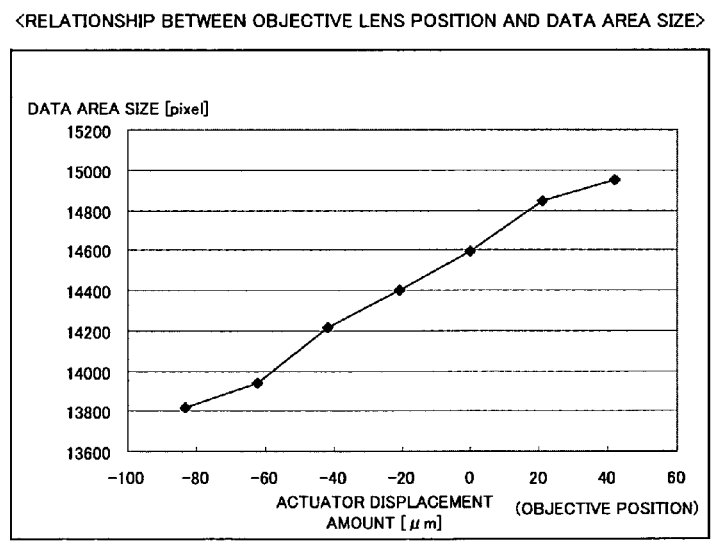
FIG. 8(b) is a graph showing the relationship between the objective lens position and a data area size.

FIG. 8(b) shows the relationship between the objective lens position and the size of a data area. As in the case of FIG. 8(a), the objective lens position is shown on the axis of abscissa as the amount of displacement of the actuator. The axis of ordinate indicates the size of the data area. The data area corresponds to the area of the spatially-modulated image pattern 50, shown in FIG. 4, that is, the area of the recording data. As shown in the figure, the focus position and the data area size have an almost linear correlation. This graph involves the case in which the markers 52 are provided in the four corners of the spatially-modulated image pattern 50 as shown in FIG. 4(c), and the data area size is equal to the marker area size MS. Further, this graph is obtained for the spatially-modulated image pattern 50 having the region of 120×120 pixels in both vertical and horizontal directions, and the reference marker area size MDref=14,400 (pixels$^2$). Therefore, when the marker area size MSdet=14,400 (pixels$^2$), that is, the actuator displacement amount=−20, the objective lens is almost in focus.

FIG. 8(a) indicates that when the actuator displacement amount=−20, that is, the objective lens is almost in focus, the error rate is minimized. In this manner, since there is a correlation between the marker position relationship such as the marker area size and the focus state, precise servo control can be performed in the present embodiment by determining the target value for focus servo on the basis of the marker position relationship.

Figure 9:
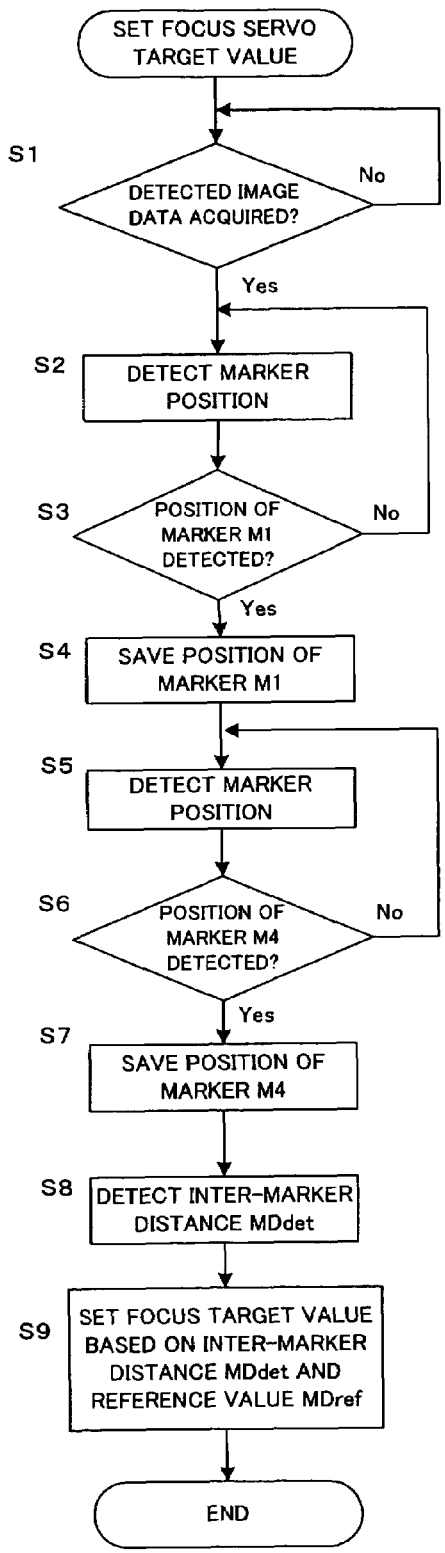
FIG. 9 is a flowchart of a process for setting a target value for focus servo.

Now, with reference to FIG. 9, description will be given of a process for setting the focus servo target value. FIG. 9 is a flowchart of the process for setting the focus servo target value. In this flowchart, the inter-marker distance MD is used as the marker position relationship. This process is mainly executed by the marker position detector 42, the marker position relationship detecting unit 43, and the servo target value setting unit 45.

In FIG. 9, first, it is determined whether or not the marker position detector 42 has acquired a predetermined amount of detected image data Ddet (step S1). If the marker position detector 42 has acquired the predetermined amount of detected image data Ddet, it detects the marker position included in the data (step S2). In the present example, the marker positions M1 and M4 defining the inter-marker distance MD are to be detected as shown in FIG. 5(b). When the marker M1 is detected, the marker position detector 42 saves its position (step S4), and the marker position detector 42 further detects another marker position (step S5). Then, similarly, when the marker M4 is detected (step S6; Yes), the marker position detector 42 saves its position (step S7). The marker position detector 42 supplies, to the marker position detecting unit 43, the position coordinates of the markers M1 and M4 thus saved, as marker position data Mp.

The marker position relationship detecting unit 43 detects the inter-marker distance MDdet in accordance with equation (1) (step S8), and supplies the inter-marker distance MDdet to the adder 44. The reference inter-marker distance MDref has already been input to the adder 44, and the difference between the inter-marker distance MDdet and the reference inter-marker distance MDref is input to the servo target value setting unit 45.

The servo target value setting unit 45 sets the servo target value Fref in accordance with, for example, equation (2) (step S9). The servo target value is thus set.

The servo target value Fref thus set and updated is supplied to the adder 33 in the focus servo loop. The focus servo loop performs the servo control using the servo target value Fref.

Figure 10:
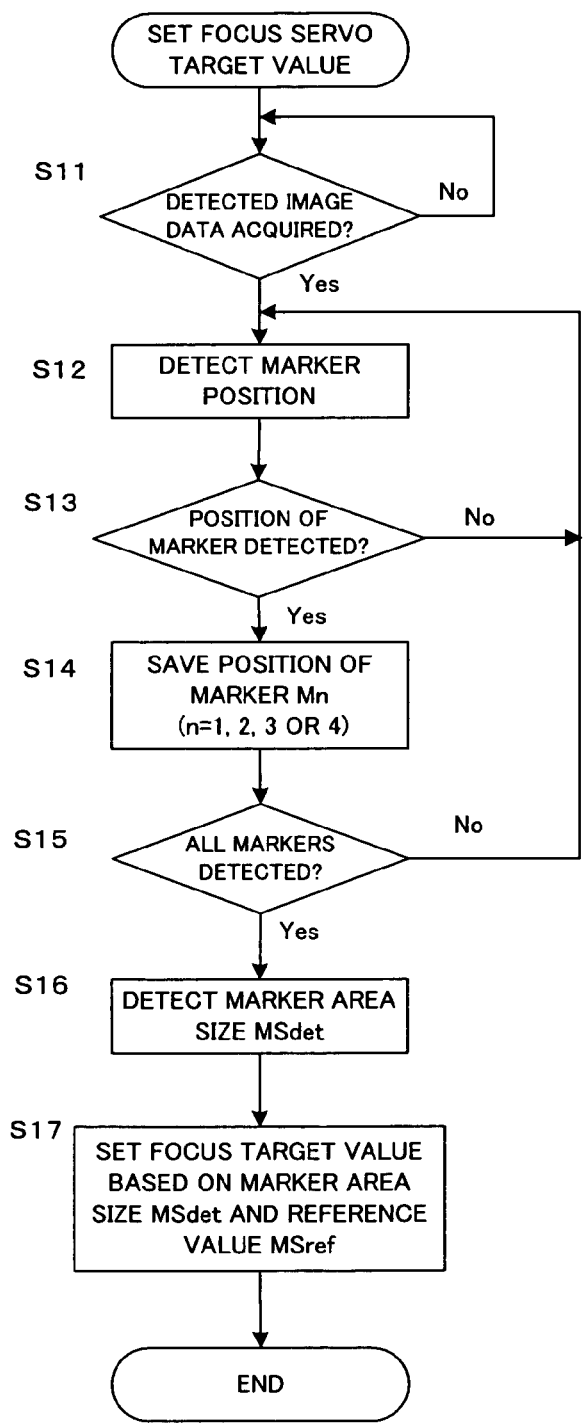
FIG. 10 is another flowchart of a process for setting a target value for focus servo.

On the other hand, FIG. 10 shows a process for setting the servo target value in which the marker area size MS is used as the marker position relationship, instead of the inter-marker distance MD. First, the marker position detector 42 acquires a predetermined amount of detected image data Ddet (step S1), and detects the marker positions (step S12). When the marker positions are detected (step S13), the marker position detector 42 saves the marker positions (step S14). When all the marker positions defining the marker region have thus been detected (step S15; Yes), the marker position relationship detecting unit 43 detects the marker area size MSdet using, for example, the Equation (3) (step S16). Then, the adder 44 compares the inputted marker area size MSdet with the reference marker position relationship MSref, and sets the servo target value Fref in accordance with the equation (4) on the basis of the result of the comparison (step S17).

The servo target value Fref thus set and updated is supplied to the adder 33 in the focus servo loop. The focus servo loop performs the servo control using the servo target value Fref.

Figure 11:
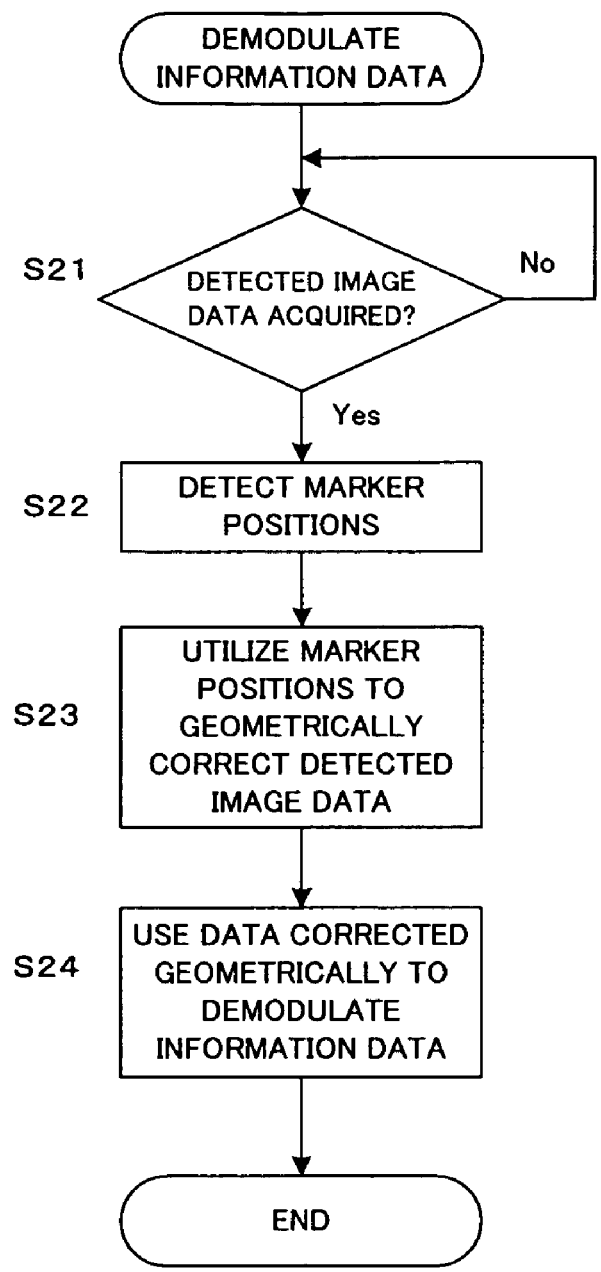
FIG. 11 is a flowchart of a process for demodulating information data.

Now, with reference to FIG. 11, description will be given of a process for demodulating information data. FIG. 11 is a flowchart of the process of demodulating information data. This process is executed by the marker position detector 42 and data demodulating unit 46, shown in FIG. 3.

First, the marker position detector 42 determines whether or not a predetermined amount of detected image data Ddet has been acquired (step S21). If the predetermined amount of detected image data Ddet has been acquired, the marker position detector 42 detects and saves the marker positions (step S22). Then, the data demodulating unit 46 utilizes the detected marker positions to geometrically correct the detected image data Ddet (step S23). The data demodulating unit 46 then uses the data corrected geometrically to demodulate information data, and outputs the resultant data (step S24). In this manner, the information data is reproduced from the recording medium 1.

In the above example, since the four markers 52 are provided outside and separately from the spatially-modulated image pattern 50 as shown in FIG. 4(a), the marker area does not match the area of the spatially-modulated image pattern 50, that is, the area of the recording information (data area). However, if the four markers are provided at the respective corners as shown in FIG. 4(c), the marker area matches the area of the spatially-modulated image pattern 50, that is, the data area.

According to the present invention, the marker 52 is not limited to the T shape shown in FIG. 4. Further, the positions and number of markers 52 included in the display screen 54 on the spatial modulator 14 are not limited to those shown in FIGS. 4(a) and 4(c). It is only necessary to provide at least two markers 52 in order to identify the marker position relationship. Further, in the example shown in FIG. 4(a), the four markers have the same shape, but markers having different shapes may be arranged.

As described above, in the first embodiment, the target value for focus servo is finely adjusted so that the inter-marker distance or marker area size detected by the two-dimensional sensor matches its reference value. It is thus possible to match the image size on the space modulator in the recording system with the image size on the two-dimensional sensor in the reproduction system. This improves what is called a pixel matching characteristic, thus enabling the accurate reproduction of a spatially-modulated pattern corresponding to information data to be reproduced.

Further, the servo target value is always finely adjusted to optimize the focus servo system, utilizing the marker position relationship information obtained by the reproduction system for information data. Accordingly, even if for example, an environment such as temperature changes or the recording medium contracts, the servo target volume can be appropriately updated. As a result, precise focus servo can be continued.

Furthermore, the result of detection of the marker position can be used both for the geometric correction for the reproduction of information data and for the fine adjustment of the focus servo target value. In general, the template matching process for the detection of the marker positions requires a large amount of calculations and thus a long time. However, since the results of the process can be shared, it is possible to stabilize the focus servo and to improve the accuracy of reproducing information data, at the same time, without increasing the time required for processing.

In the above description, the number of pixels in the spatial modulator is the same as that in the two-dimensional sensor. However, these numbers maybe different; for example, the number of pixels may be 60×60 in the spatial modulator and 120×120 in the two-dimensional sensor.

Second Embodiment

Now, a second embodiment of the present invention will be described. According to the first embodiment, the marker positions are detected on the basis of the detected image data Ddet, and the servo target value for focus servo is set and updated on the basis of the marker positions thus detected. In contrast, according to the second embodiment, the error rate of reproduced information data is measured on the basis of the detected image data Ddet, and then the servo target value for focus servo is set and updated on the basis of the error rate. The second embodiment is otherwise similar to the first embodiment.

Figure 12:
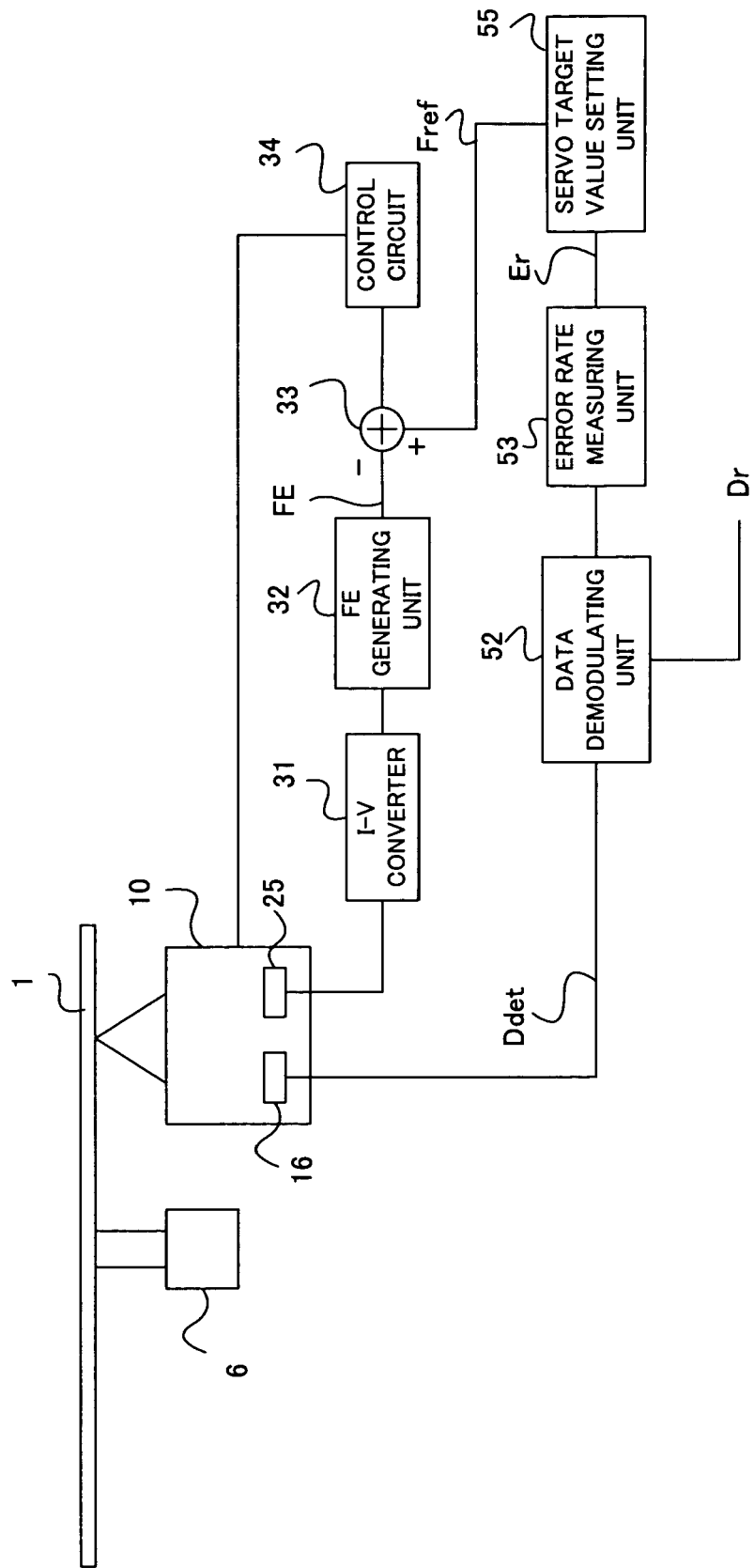
FIG. 12 is a block diagram schematically showing the configuration of a signal processing system in a hologram recording and reproducing apparatus according to a second embodiment.

FIG. 12 schematically shows the configuration of a hologram recording and reproducing apparatus according to the second embodiment. The same reference numerals are used to denote components shown in FIG. 3 which are the same as those of the hologram recording and reproducing apparatus according to the first embodiment. Their description is thus omitted.

In the hologram recording and reproducing apparatus according to the second embodiment shown in FIG. 12, the configuration of the optical system of the pickup 10 is the same as that according to the first embodiment. Further, the focus servo loop constituted by the I-V converter 31, the FE generating unit 32, the adder 33 and the control circuit 34 is the same as that according to the first embodiment.

In the second embodiment, a data demodulator 52 demodulates the detected image data Ddet output by the two-dimensional sensor 16 in the pickup 10, and outputs reproduced information data Dr. As in the case of the first embodiment, the data demodulating unit 52 demodulates information data using a demodulation system corresponding to two-dimensional digital modulation carried out by the spatial modulator 14 during recording. The information data demodulated by the data demodulating unit 52 is sent to an error rate measuring unit 53. The error rate measuring unit 53 measures the error rate and supplies the error rate thus measured to a servo target value setting unit 55.

The servo target value setting unit 55 determines the servo target value Fref on the basis of the error rate. Specifically, the servo target setting unit 55 determines the servo target value Fref so as to minimize the error rate. FIG. 8(a) shows an example of the relationship between the objective lens position and the error rate. For example, on the basis of the relationship shown in FIG. 8(a), the servo target value setting unit 55 sets the servo target value Fref for the focus servo loop so as to obtain an amount of actuator displacement (that is, an objective lens position) with which the error rate becomes minimum. As previously described with reference to FIGS. 8(a) and 8(b), the error rate is minimized when a light beam is focused. Thus, the appropriate servo target value can be set by setting the servo target value such that the error rate becomes minimum.

As described above, in the second embodiment, in addition to the servo control performed utilizing the focus error signal obtained by the focus servo system, the servo target value is determined on the basis of the error rate obtained by the reproduction system of information data. Accordingly, even if for example, an environment such as temperature changes or the recording medium contracts, the servo target volume can be appropriately updated and precise focus servo can be continued.

Modification

It is possible to apply a combination of the first and second embodiments. Specifically, it is possible to use, in combination, the servo target value set on the basis of the marker positions as in the first embodiment and the servo target value set on the basis of the error rate as in the second embodiment.

As an actual procedure for reproducing information, the marker positions are detected at the first stage, and the marker positions are used to geometrically correct two-dimensional data at the second stage. Then, in the third stage, the information data geometrically corrected is subjected to demodulation and error corrections. In the third stage, the error rate can be obtained. Accordingly, the marker positions are detected in order to obtain the error rate, and the servo target value is adjusted on the basis of the results of detection of the marker positions.

Specifically, in an initializing process, the marker positions are detected, and the servo target value is adjusted on the basis of the result of the detection to determine a first servo target value. In this case, a predetermined initial value is used as a marker area size (first marker area size).

Then, the error rate is measured while varying the servo target value within a predetermined range around the first servo target value. In this case, the marker area size is simultaneously measured, and the relationship between the error rate and the marker area size is stored. Then, a marker area size (second marker area size) and a servo target value (second servo target value) are determined which make the error rate minimum. Thus, the initializing process is finished. This initializing process is executed, for example, when a disc is inserted into the recording and reproducing apparatus or when the disc is replaced.

During a normal reproduction after the initializing process, several methods for controlling the focus servo may be used.

In a first method, the focus servo is carried out using the second servo target value. In this case, the servo target value is not changed after the initialization.

In a second method, for a normal reproduction, the focus servo is started using the initial value as the second servo target value. Then, the error rate is measured. When the error rate decreases below a specified value, the above second marker area size is used to execute the adjustment of the servo target value based on the detection of the marker positions again.

In a third method, for a normal reproduction, the focus servo is started using the initial value as the second servo target value. Then, in every case, the second marker area size is used as a target to execute the adjustment of the servo target value based on the detection of the marker positions. In this method, the servo target value is always adjusted using, as a target marker area size, the second marker area size leading to the minimum error rate. This enables stable focus servo to be accomplished in spite of external factors such as a change in temperature. Further, even if the optimum marker area size deviates from a designed value, the deviation can be corrected because the second marker area size is optimized during the initializing process as previously described.

Furthermore, in the above embodiments, the optical system generates the object light and the reference light for recording using light beams from the same light source. However, the application of the present invention is not limited to this. The present invention is applicable to even a configuration in which the recording medium is irradiated with separate luminous fluxes emitted from different light source as the object light and the reference light.

Moreover, in the above embodiment, the present invention is applied to the hologram recording and reproducing apparatus which carries out information recording by recording interference fringes formed by irradiating the object light corresponding to recording information and the reference light, and which reproduces the information recorded. Alternatively, the present invention is applicable to a hologram reproducing apparatus which reproduces information from a holographic recording medium on which interference fringes formed by irradiating the object light corresponding to recording information and the reference light are recorded.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-422219 filed on Dec. 19, 2003 including the specification, claims, drawings and summary is incorporated herein by reference in its entirety.

What is claimed is:

1. A hologram recording and reproducing apparatus comprising:
   a recording unit which records information on a holographic recording medium by recording interference fringes formed by irradiating an object light corresponding to recording information and a reference light;
   a reproducing unit which generates detected information data and a focus error signal based on detected light from the holographic recording medium; and
   a focus servo unit which performs focus servo based on the focus error signal,
   wherein the focus servo unit comprises a servo target value setting unit which sets a target value for the focus servo based on the detected information data,
   wherein the servo target value setting unit comprises:
      a unit which detects a distance between two markers included in the detected information data; and
      a setting unit which sets the target value for the focus servo based on a result of a comparison of the distance between the markers with a distance reference value,
   wherein the recording unit comprises a spatial modulator which spatially modulates light from a light source based on the recording information to generate the object light, and
   wherein the distance reference value is a distance between the two markers on the spatial modulator.

2. The hologram recording and reproducing apparatus according to claim 1, wherein the servo target value setting unit comprises:
   a first determining unit which determines the target value set by the setting unit as a first target value; and
   a second determining unit which determines a second target value for the focus servo based on an error rate of the detected information data, and
   wherein the focus servo unit performs the focus servo using the first and the second target values for the focus servo.

3. The hologram recording and reproducing apparatus according to claim 2, wherein the focus servo unit performs the focus servo by using the first target value for the focus servo during a time period after the focus servo has been started for one holographic recording medium and by using the second target value for the focus servo after the time period has elapsed.

4. A hologram recording and reproducing apparatus comprising:
   a recording unit which records information on a holographic recording medium by recording interference fringes formed by irradiating an object light corresponding to recording information and a reference light;
   a reproducing unit which generates detected information data and a focus error signal based on detected light from the holographic recording medium; and
   a focus servo unit which performs focus servo based on the focus error signal,
   wherein the focus servo unit comprises a servo target value setting unit which sets a target value for the focus servo based on the detected information data,
   wherein the servo target value setting unit comprises:
      a unit which detects a size of a marker area defined by a plurality of markers included in the detected information data; and
      a setting unit which sets the target value for the focus servo based on a result of a comparison of the size of the marker area with an area reference value,
   wherein the recording unit comprises a spatial modulator which spatially modulates light from a light source based on the recording information to generate the object light, and
   wherein the area reference value is a size of the marker area on the spatial modulator.

5. The hologram recording and reproducing apparatus according to claim 4, wherein the servo target value setting unit comprises:
   a first determining unit which determines the target value set by the setting unit as a first target value; and
   a second determining unit which determines a second target value for the focus servo based on an error rate of the detected information data, and
   wherein the focus servo unit performs the focus servo using the first and the second target values for the focus servo.

6. The hologram recording and reproducing apparatus according to claim 5, wherein the focus servo unit performs the focus servo by using the first target value for the focus servo during a time period after the focus servo has been started for one holographic recording medium and by using the second target value for the focus servo after the time period has elapsed.

7. A hologram reproducing apparatus which reproduces information from a holographic recording medium on which interference fringes formed by irradiating an object light corresponding to recording information and a reference light are recorded by a hologram recording device having a spatial modulator which spatially modulates light from a light source based on the recording information to generate the object light, the hologram reproducing apparatus comprising:
   a reproducing unit which generates detected information data and a focus error signal based on detected light from the holographic recording medium; and
   a focus servo unit which performs focus servo based on the focus error signal,
   wherein the focus servo unit comprises a servo target value setting unit which sets a target value for the focus servo based on the detected information data,
   wherein the servo target value setting unit comprises:
      a unit which detects a distance between two markers included in the detected information data; and
      a setting unit which sets the target value for the focus servo based on a result of a comparison of the distance between the markers with a distance reference value, and
   wherein the distance reference value is a distance between the two markers on the spatial modulator.

8. The hologram reproducing apparatus according to claim 7, wherein the servo target value setting unit comprises:
   a first determining unit which determines the target value set by the setting unit as a first target value; and
   a second determining unit which determines a second target value for the focus servo based on an error rate of the detected information data, and
   wherein the focus servo unit performs the focus servo using the first and the second target values for the focus servo.

9. The hologram reproducing apparatus according to claim 8, wherein the focus servo unit performs the focus servo by using the first target value for the focus servo during a time period after the focus servo has been started for one holographic recording medium and by using the second target value for the focus servo after the time period has elapsed.

10. A hologram reproducing apparatus which reproduces information from a holographic recording medium on which interference fringes formed by irradiating an object light corresponding to recording information and a reference light are recorded by a hologram recording device having a spatial modulator which spatially modulates light from a light source based on the recording information to generate the object light, the hologram reproducing apparatus comprising:

a reproducing unit which generates detected information data and a focus error signal based on detected light from the holographic recording medium; and a focus servo unit which performs focus servo based on the focus error signal, wherein the focus servo unit comprises a servo target value setting unit which sets a target value for the focus servo based on the detected information data, wherein the servo target value setting unit comprises:

a unit which detects a size of a marker area defined by a plurality of markers included in the detected information data; and a setting unit which sets the target value for the focus servo based on a result of a comparison of the size of the marker area with an area reference value, and wherein the area reference value is a size of a marker area on the spatial modulator.

11. The hologram reproducing apparatus according to claim 10, wherein the servo target value setting unit comprises:

a first determining unit which determines the target value set by the setting unit as a first target value; and a second determining unit which determines a second target value for the focus servo based on an error rate of the detected information data, and wherein the focus servo unit performs the focus servo using the first and the second target values for the focus servo.

12. The hologram reproducing apparatus according to claim 11, wherein the focus servo unit performs the focus servo by using the first target value for the focus servo during a time period after the focus servo has been started for one holographic recording medium and by using the second target value for the focus servo after the time period has elapsed.

* * * * *